(12) United States Patent
Franklin et al.

(10) Patent No.: US 9,015,844 B1
(45) Date of Patent: Apr. 21, 2015

(54) TECHNIQUES FOR WEB APPLICATION VULNERABILITY SCANNING

(75) Inventors: Jason Franklin, San Francisco, CA (US); Yin Liu, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 81 days.

(21) Appl. No.: 13/532,327

(22) Filed: Jun. 25, 2012

(51) Int. Cl.
| | |
|---|---|
| G06F 12/14 | (2006.01) |
| G06F 17/00 | (2006.01) |
| H04L 29/06 | (2006.01) |
| G06F 11/30 | (2006.01) |
| G06F 9/44 | (2006.01) |
| G06F 21/57 | (2013.01) |

(52) U.S. Cl.
CPC ............... *G06F 21/577* (2013.01); *G06F 21/57* (2013.01)

(58) Field of Classification Search
USPC ......... 726/1, 25; 713/165, 187; 717/124, 126, 717/127
See application file for complete search history.

(56) References Cited

U.S. PATENT DOCUMENTS

| | | | |
|---|---|---|---|
| 2001/0044825 A1* | 11/2001 | Barritz .......................... | 709/203 |
| 2004/0117460 A1* | 6/2004 | Walsh et al. .................. | 709/219 |
| 2005/0132232 A1* | 6/2005 | Sima ............................. | 713/201 |
| 2006/0150256 A1* | 7/2006 | Fanton et al. ................. | 726/27 |
| 2012/0072968 A1* | 3/2012 | Wysopal et al. .............. | 726/1 |
| 2012/0102541 A1* | 4/2012 | Groskop et al. .............. | 726/1 |

OTHER PUBLICATIONS

Bau et al., "State of the Art: Automated Black-Box Web application Vulnerability testing," 2010 IEEE Symposium on Security and Privacy, pp. 332-345 (May 16-19, 2010).
Jil Verdol, "Automating Content Security Policy Generation," A Thesis in Computer Science and Engineering, Pennsylvania State University, Dept. of Computer Science and Engineering, Aug. 2011 (47 pages).
Ashar Javed, "CSP AiDer: An Automated Recommandation of Content Security Policy for Web Applicaitons," Poster for the IEEE Symposium in Security and Privacy at the Claremont Resort, Oakland, California, (May 22-25, 2011) (4 pages).

* cited by examiner

*Primary Examiner* — Aravind Moorthy
(74) *Attorney, Agent, or Firm* — Wilmer Cutler Pickering Hale and Dorr LLP

(57) ABSTRACT

Techniques for web application vulnerability scanning are disclosed. In one particular embodiment, the techniques may be realized as a method for web application vulnerability scanning comprising crawling a web application for content associated with the web application, generating a client security policy based on the content associated with the web application, and scanning the web application for vulnerabilities based on the client security policy.

16 Claims, 4 Drawing Sheets

TECHNIQUES FOR WEB APPLICATION VULNERABILITY SCANNING

FIELD OF THE DISCLOSURE

The present disclosure relates generally to web applications and, more particularly, to techniques for web application vulnerability scanning.

BACKGROUND OF THE DISCLOSURE

Web application vulnerabilities such as cross-site scripting (XSS), click jacking, and Iframe injection are major security concerns on the Internet today. Malicious adversaries can exploit these vulnerabilities to harm both web application providers and users. Exploits may enable adversaries to steal sensitive data from a client's browsing session, inject malicious code into a web session, or otherwise interfere with a client's interaction with cloud services. For example, if a bank's website has a XSS vulnerability, an adversary can exploit this vulnerability to run arbitrary scripts in the context of a user's banking session. The malicious scripts could perform damaging actions such as unauthorized balance transfers, credential theft, and denial-of-service attacks.

Conventional web application vulnerability scanners attempt to identify vulnerabilities by injecting test vectors into web applications and distinguishing successful attacks based on application output. In general, a web vulnerability scanner reads in a web application, executes the application, and applies a variety of tests to identify possible web vulnerabilities. For example, a conventional scanner might perform a number of submissions to a web forum and inspect the posted submissions to identify whether the forum correctly filtered the input submissions.

Conventional scanners have several limitations. First, for example, some conventional scanners perform scans on web applications without using a specification of correct behavior. Instead, they apply heuristics to attempt to identify code injection vulnerabilities. Second, some conventional scanners apply the same detection heuristics to each scanned web application and as a result achieve poor coverage of an application's behavior. Third, some conventional scanners typically scan for vulnerabilities as scripts are executing, i.e., execution-time detection, which is less desirable than scanning for vulnerabilities as scripts are loaded, i.e., load-time detection.

Some conventional scanners generate more false warnings and detect fewer vulnerabilities because, in part, they apply a blanket policy to all web applications. Conventional scanners do not use client security policies (CSPs) specific to the scanned web applications, so they use a heuristic approach based on a blanket policy rather than an algorithmic approach based on specific CSPs.

In view of the foregoing, it may be understood that there may be significant problems and shortcomings associated with current web application vulnerability scanning technologies.

SUMMARY OF THE DISCLOSURE

Techniques for web application vulnerability scanning are disclosed. In one particular embodiment, the techniques may be realized as a method for web application vulnerability scanning comprising crawling a web application for content associated with the web application, generating a client security policy based on the content associated with the web application, and scanning the web application for vulnerabilities based on the client security policy.

In accordance with further aspects of this particular embodiment, the method may comprise performing dynamic analysis on the content associated with the web application.

In accordance with additional aspects of this particular embodiment, the method may comprise driving the web application using an augmented web browser to simulate at least one user interaction with the web application.

In accordance with additional aspects of this particular embodiment, the web application may comprise at least one webpage.

In accordance with additional aspects of this particular embodiment, the client security policy may comprise a white list of at least one allowable source for content of the web application.

In accordance with additional aspects of this particular embodiment, the at least one allowable source for content of the web application may comprise at least a location of a JavaScript script.

In accordance with additional aspects of this particular embodiment, scanning the web application for vulnerabilities based on the client security policy may comprise simulating an interaction with the web application.

In accordance with additional aspects of this particular embodiment, the method may comprise detecting at least one violation of the client security policy, and reporting at least one web application vulnerability based on the at least one violation of the client security policy.

In another particular exemplary embodiment, the techniques may be realized as a system for web application vulnerability scanning comprising one or more processors communicatively coupled to a network, wherein the one or more processors are configured to crawl a web application for content associated with the web application, generate a client security policy based on the content associated with the web application, and scan the web application for vulnerabilities based on the client security policy.

In accordance with additional aspects of this particular embodiment, the one or more processors may be further configured to perform dynamic analysis on the content associated with the web application.

In accordance with additional aspects of this particular embodiment, the web application may comprise at least one webpage.

In accordance with additional aspects of this particular embodiment, the client security policy may comprise a white list of at least one allowable source for content of the web application.

In accordance with additional aspects of this particular embodiment, the at least one allowable source for content of the web application may comprise at least a location of a JavaScript script.

In accordance with additional aspects of this particular embodiment, the one or more processors may be further configured to scan the web application for vulnerabilities by simulating an interaction with the web application.

In yet another particular exemplary embodiment, the techniques may be realized as an article of manufacture for web application vulnerability scanning, the article of manufacture comprising at least one non-transitory processor readable storage medium, and instructions stored on the at least one medium, wherein the instructions are configured to be readable from the at least one medium by at least one processor and thereby cause the at least one processor to operate so as to crawl a web application for content associated with the web application, generate a client security policy based on the content associated with the web application, and scan the web application for vulnerabilities based on the client security policy.

In accordance with additional aspects of this particular embodiment, the instructions may cause the at least one processor to operate further so as to perform dynamic analysis on the content associated with the web application.

In accordance with additional aspects of this particular embodiment, the web application may comprise at least one webpage.

In accordance with additional aspects of this particular embodiment, the client security policy may comprise a white list of at least one allowable source for content of the web application.

In accordance with additional aspects of this particular embodiment, the at least one allowable source for content of the web application may comprise at least a location of a JavaScript script.

In accordance with additional aspects of this particular embodiment, the instructions may cause the at least one processor to operate further so as to scan the web application for vulnerabilities by simulating an interaction with the web application.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
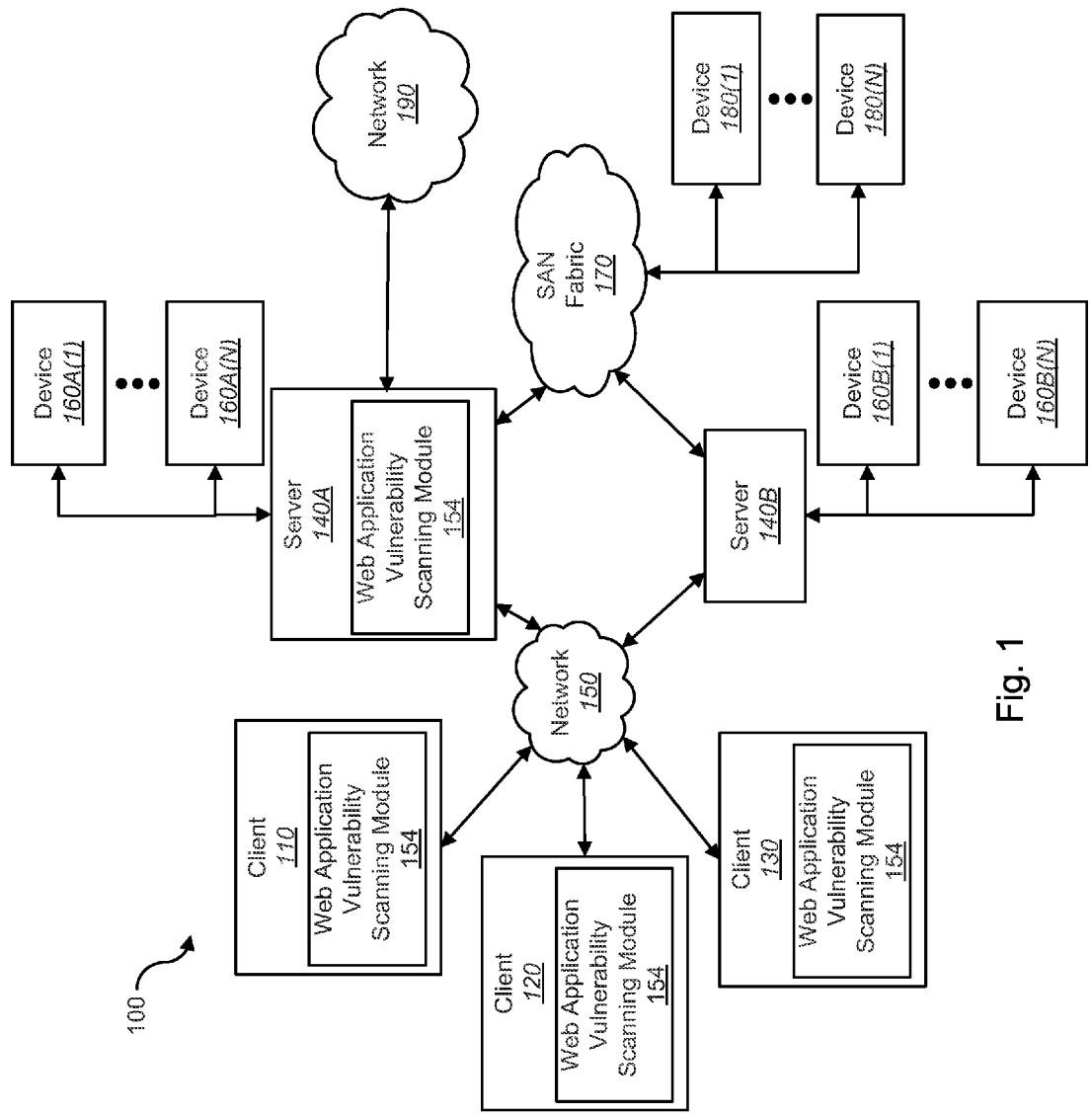
FIG. 1 shows a block diagram depicting a network architecture in accordance with an embodiment of the present disclosure.

FIG. 1 shows a block diagram depicting a network architecture 100 for web application vulnerability scanning in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A (1)-(N), and server 140B may be communicatively coupled to storage devices 160B(1)-(N). Servers 140A and 140B may contain a management module (e.g., web application vulnerability scanning module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
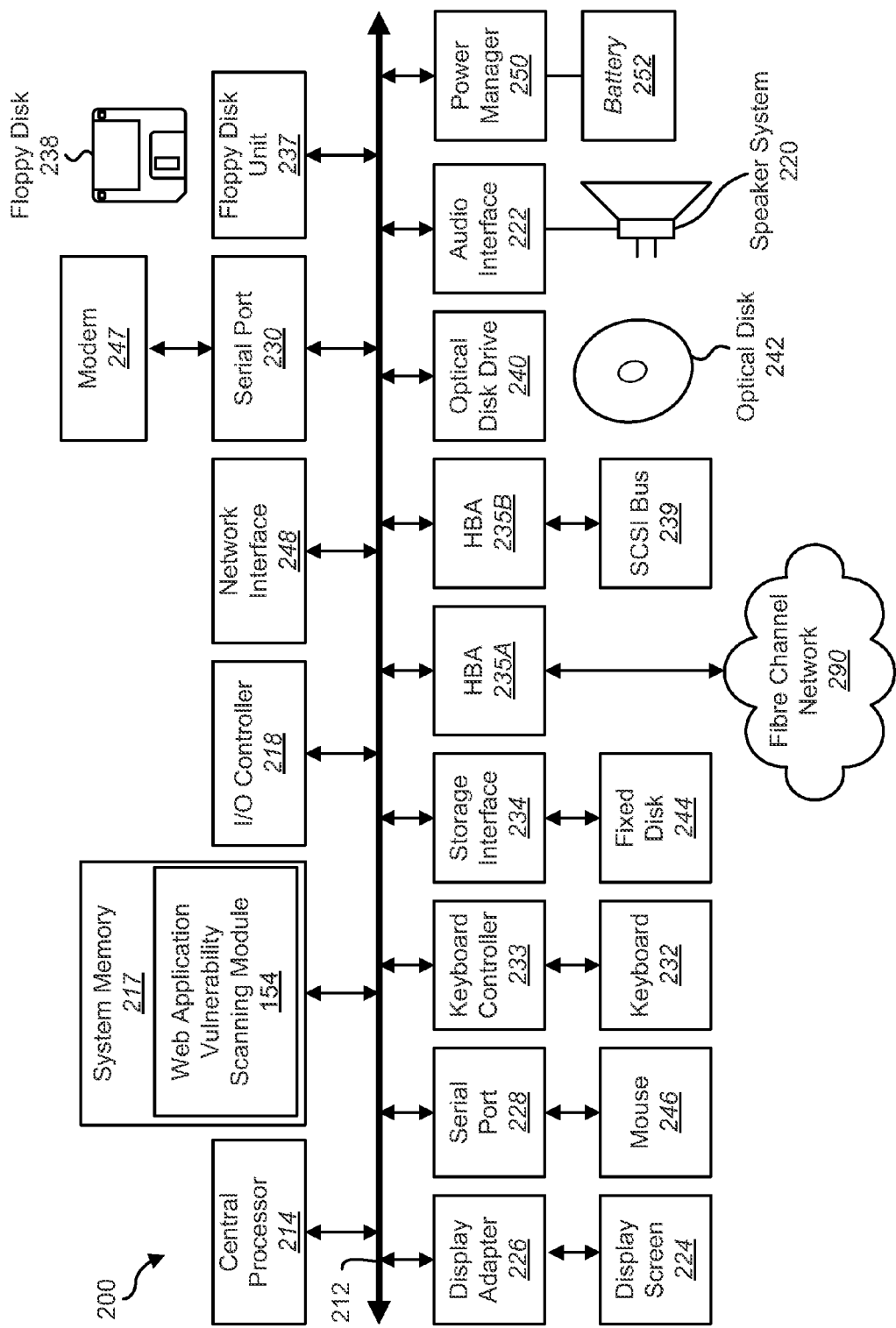
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B (1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for web application vulnerability scanning such as, for example, web application vulnerability scanning module 154. As illustrated, one or more portions of web application vulnerability scanning module may reside at a network centric location. For example, server 140A may be a server, a firewall, a gateway, or other network element that may perform one or more actions to scan web applications for vulnerabilities. According to some embodiments, network 190 may be an external network (e.g., the Internet) and server 140A may be a gateway or firewall between one or more internal components and clients and the external network. According to some embodiments, web application vulnerability scanning module 154 may be implemented as part of a cloud computing environment.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, web application vulnerability scanning module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
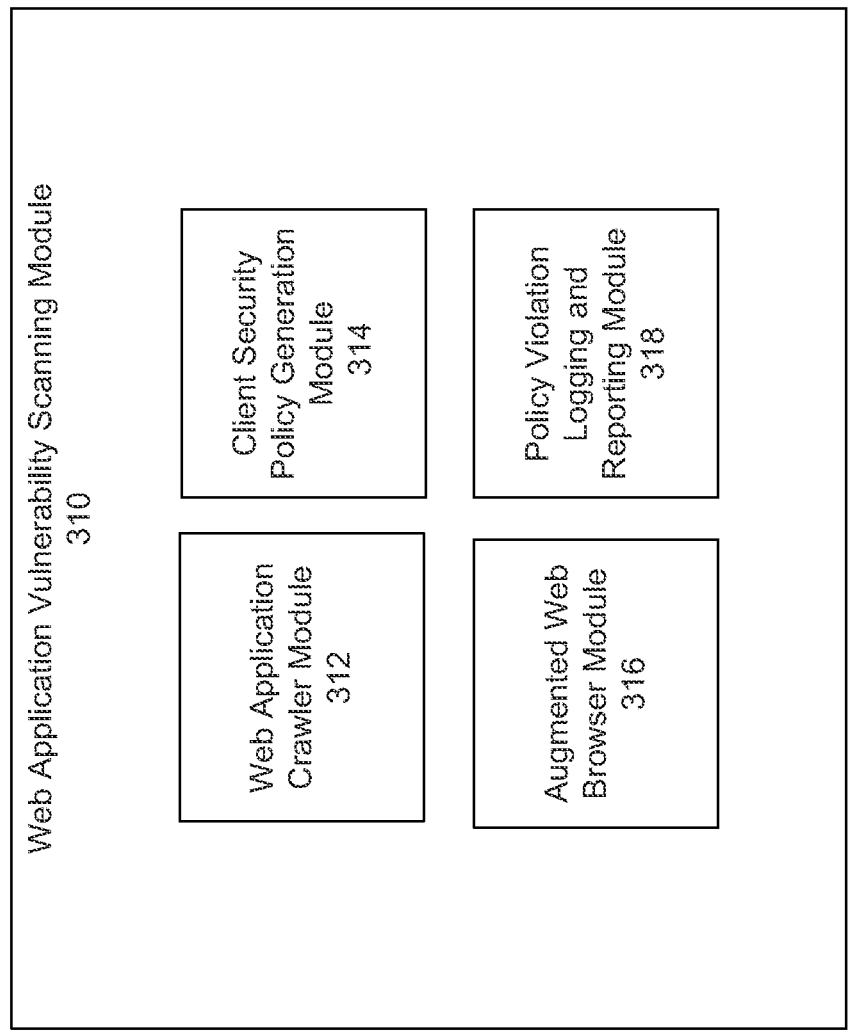
FIG. 3 shows a module web application vulnerability scanning in accordance with an embodiment of the present disclosure.

Referring to FIG. 3, there is shown a web application vulnerability scanning module 310 in accordance with an embodiment of the present disclosure. As illustrated, the web application vulnerability scanning module 310 may contain one or more components including web application crawler module 312, client security policy generation module 314, augmented web browser module 316, and policy violation logging and reporting module 318.

The description below describes network elements, computers, and/or components of a system and method for web application vulnerability scanning that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

According to some embodiments, web application crawler module 312 may obtain information about a web application. A web application may be one or more webpages. The crawler module 312 may fetch a webpage at a particular domain or a uniform resource locator (URL). The webpage may contain hypertext markup language (HTML), scripts (e.g., JavaScript scripts), instructions to incorporate additional resources (e.g., JavaScript scripts or cascading style sheets (CSS)), hyperlinks to other webpages, or interface elements capable of receiving user input.

The crawler module 312 may perform static or dynamic analysis on portions of the web application to fetch additional webpages and other resources associated with the web application. For example, the crawler module 312 may analyze a webpage for static hyperlinks to other webpages of the web application and use the URLs within the hyperlinks to fetch, download, or analyze the content found at those URLs. In some embodiments, the crawler module 312 may generate dynamic interactions with interface elements on a webpage to elicit additional content of the web application from the web application's web server or associated database. For example, a webpage may include HTML forms, scripted buttons, or other interface elements that may be used to request additional content or resources of the web application. For web applications with dynamic content and resources, dynamic analysis may provide additional information to the web crawler module 312 that may not be found when using static analysis exclusively.

Crawler module 312 may store the web application content. The content may be stored within the web application vulnerability scanning module 310 or in another module or device described above such as system memory 217 or fixed disk 244. In some embodiments, the web application content may be stored indefinitely. In other embodiments, the web application content may be deleted after the client security policy generation module 314 generates a client security policy (CSP) for the web application. In other embodiments, the web application content is transferred directly to the CSP generation module 314 without being stored by the crawler module 312.

According to some embodiments, CSP generation module 314 generates a CSP associated with the web application content obtained by the crawler module 312. The CSP generation module 314 may analyze the web application content to generate security policies specific to the web application. For example, the CSP may include a white list of allowable sources for web application content. Sources may include the URLs or other locations of scripts and other web application resources. The CSP generation module 314 may also explore static or dynamic web application behavior to determine site-specific security policies.

In some embodiments, the CSP generation module 314 is completely automatic. In other embodiments, the CSP generation module 314 may receive a new CSP or modifications to an existing CSP from other sources, including manual CSP generation or modification. In other embodiments, the CSP generation module 314 may first check whether a CSP already exists for the web application to scan, or it may load a preexisting CSP and may add, remove, or modify security policies within the preexisting CSP.

CSP generation module 314 may store the generated CSP. The CSP may be stored within the web application vulnerability scanning module 310 or in another module or device described above such as system memory 217 or fixed disk 244. In some embodiments, the CSP may be stored indefinitely. In other embodiments, the CSP may be deleted after the augmented web browser module 316 uses the CSP. In other embodiments, the CSP is transferred directly to the augmented web browser module 316 without being stored by the CSP generation module 314.

According to some embodiments, augmented web browser module 316 may emulate client browsing behavior for a web application while enforcing a CSP for the web application. For example, the augmented web browser module 316 may take as input the location of a web application, the generated CSP associated with the web application, and one or more test vectors to test the web application. The test vectors may include test vectors derived from the generated CSP based on the behavior of the web application. In other embodiments, the test vectors may include general test vectors applicable to a variety of web applications.

The augmented web browser module 316 may execute the one or more test vectors. For example, the augmented web browser module 316 may simulate a client interaction based on a test vector that represents an attack on the web application. The attack may attempt to exploit cross-site scripting (XSS), click-jacking, Iframe injection, or other web application vulnerabilities. The augmented web browser module 316 may compare the observed behavior resulting from executing the test vector to the allowed behavior defined by the generated CSP for the web application.

According to some embodiments, the policy violation logging and reporting module 318 may log violations of the CSP. In some embodiments, the augmented web browser module 316 transfers violation information to the logging and reporting module 318. In other embodiments, the logging and reporting module 318 monitors the augmented web browser module 316 to detect policy violations.

The logging and reporting module 318 may store information about the policy violations. The policy violation information may be stored within the web application vulnerability scanning module 310 or in another module or device described above such as system memory 217 or fixed disk 244. In some embodiments, the policy violation information may be stored indefinitely. In other embodiments, the policy violation information may be deleted after the logging and reporting module 318 reports the policy violation information, or after a specified time period. In other embodiments, the policy violation information is reported without being stored by the logging and reporting module 318.

In some embodiments, policy violation information may include any or all of the information about a policy violation. For example, policy violation information may include the date and time of the violation, the name and location of the web application, a copy of part or all of the CSP, a copy of part or all of the test vector, a copy of part or all of the output generated by the web application in response to the test vector, the name or type of the violation, or other diagnostic information. The policy violation information may identify a type of web application vulnerability or information about the source of a web application vulnerability to facilitate securing the web application.

In some embodiments, the logging and reporting module 318 may report the policy violation information on a rolling basis. In other embodiments, the logging and reporting module 318 may send reports of policy violation information at scheduled times (e.g., once a day or once a week). In still other embodiments, the logging and reporting module 318 may wait for a signal or detect a signal from the augmented web browser 316 indicating that it has finished scanning a web application for vulnerabilities. If no policy violations were found during a scan, the logging and reporting module 318 may generate a report indicating that no policy violations were found.

Figure 4:
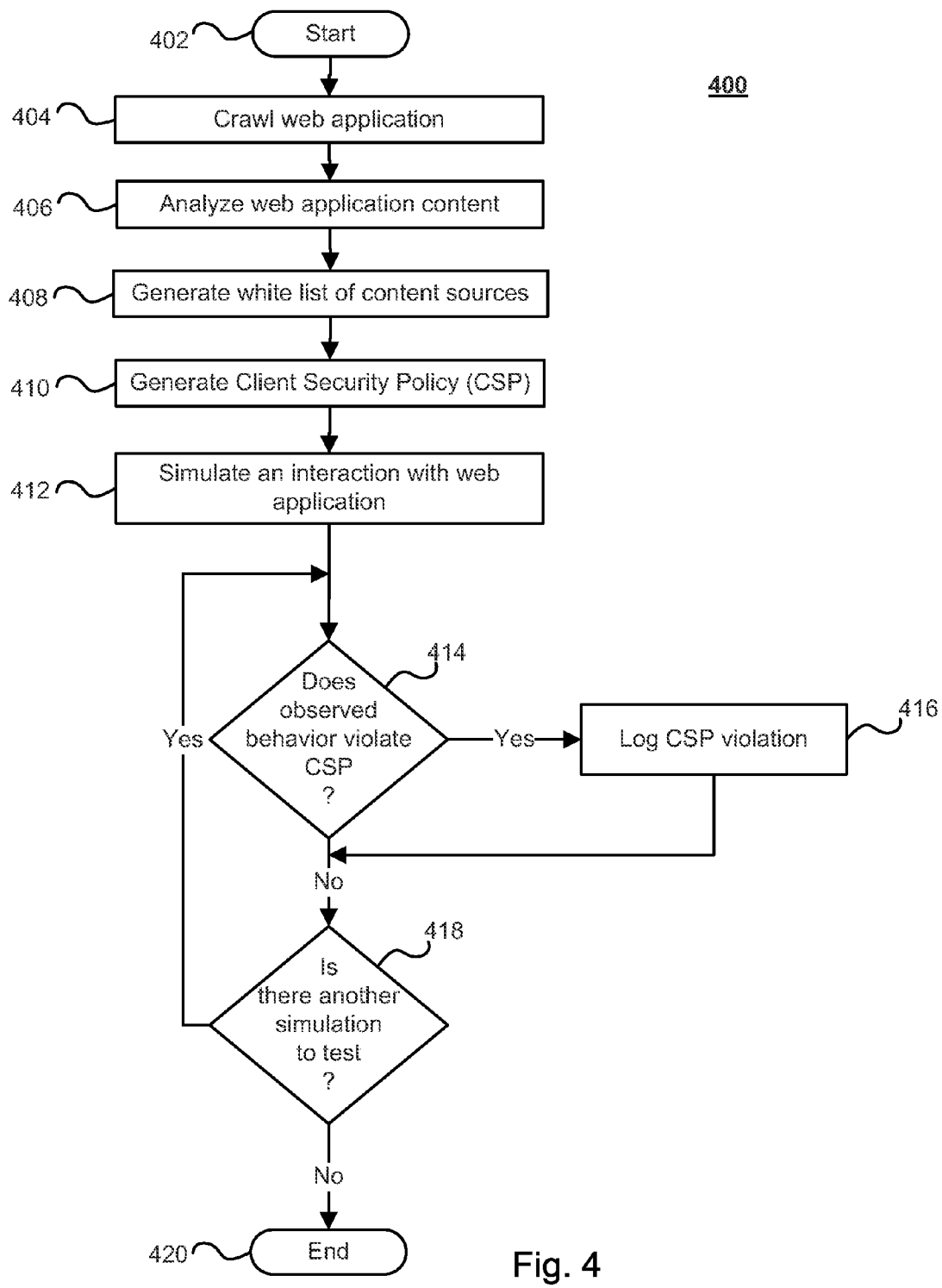
FIG. 4 depicts a method for web application vulnerability scanning in accordance with an embodiment of the present disclosure.

Referring to FIG. 4, there is depicted a method 400 for web application vulnerability scanning in accordance with an embodiment of the present disclosure. At block 402, the method 400 may begin.

At block 404, a web application may be crawled. As the web application is crawled, static or dynamic analysis may be performed on portions of the web application to fetch additional webpages and other resources associated with the web applications and use the URLs within the hyperlinks to fetch download, or analyze the content found at those URLs. In some embodiments, dynamic interactions with interface elements on a webpage may be generated to elicit additional content of the web application from the web application's web server or associated database. For web applications with dynamic content and resources, dynamic analysis may be performed to provide additional information that may not be found when using static analysis exclusively. The web application content may be stored as it is crawled.

At block 406, the crawled web application content may be analyzed to generate security policies specific to the web application. The analysis at block 406 may include additional static or dynamic analysis of the web application content and resources to determine site-specific security policies.

At block 408, a white list of allowable sources for web application content may be generated. Sources may include the URLs or other locations of scripts and other web application resources.

At block 410, a CSP may be generated. The CSP may be based on the analysis performed at block 406 and the white list generated at block 408. In some embodiments, the CSP is generated automatically. In other embodiments, new or modified CSPs may be received from other sources.

At block 412, interaction with the web application may be simulated. The interaction may emulate client browsing behavior for the web application while enforcing the CSP for the web application. Interaction may be simulated with one or more test vectors to test the web application. The test vectors may include test vectors derived from the generated CSP based on the behavior of the web application. In other embodiments, the test vectors may include general test vectors applicable to a variety of web applications.

The simulated interaction may include execution of one or more of the test vectors. For example, the interaction may simulate a client interaction based on a test vector that represents an attack on the web application.

At block 414, the behavior of the web application resulting from executing the test vector may be observed and compared to the allowed behavior defined by the generated CSP for the web application. If the observed behavior violates the CSP, then the method 400 may continue at block 416. If the observed behavior does not violate the CSP, then the method 400 may continue at block 418.

At block 416, the CSP violation may be logged. In some embodiments, the CSP violation log may include any or all information about a CSP violation. For example, CSP violation information may include the date and time of the violation, the name and location of the web application, a copy of part or all of the CSP, a copy of part or all of the test vector, a copy of part or all of the output generated by the web application in response to the test vector, the name or type of the violation, or other diagnostic information. The policy violation information may identify a type of web application vulnerability or information about the source of a web application vulnerability to facilitate securing the web application. The CSP violation may be reported before the method 400 continues at block 418. In other embodiments, one or more CSP violations may be reported prior to the method 400 ending at block 420.

At block 418, the CSP or test vectors may be checked to determine whether there are additional simulations to execute. If there is another simulation to test, then the method 400 may return to block 414. If there is no other simulation to test, then the method 400 may continue to block 420.

At block 420, the method 400 may end.

At this point it should be noted that web application vulnerability scanning in accordance with the present disclosure as described above may involve the processing of input data and the generation of output data to some extent. This input data processing and output data generation may be implemented in hardware or software. For example, specific electronic components may be employed in a web application vulnerability scanner or similar or related circuitry for implementing the functions associated with web application vulnerability scanning in accordance with the present disclosure as described above. Alternatively, one or more processors operating in accordance with instructions may implement the functions associated with web application vulnerability scanning in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for web application vulnerability scanning comprising the steps of:

crawling a web application for content associated with the web application, including generating dynamic interactions with interface elements to elicit additional dynamic content;

generating a client security policy based on the content associated with the web application;

deriving test vectors from the client security policy;

simulating at least one user interaction with the web application using an augmented web browser that is configured to enforce the client security policy during a simulation; and scanning the web application for vulnerabilities by comparing an observed behavior of the web application in response to the at least one simulated user interaction to an allowed behavior defined by the generated client security policy.

2. The method of claim 1, further comprising performing dynamic analysis on the content associated with the web application.

3. The method of claim 1, wherein the web application comprises at least one webpage.

4. The method of claim 1, wherein the client security policy comprises a white list of at least one allowable source for content of the web application.

5. The method of claim 4, wherein the at least one allowable source for content of the web application comprises at least a location of a JavaScript script.

6. The method of claim 1 further comprising:
   detecting at least one violation of the client security policy; and
   reporting at least one web application vulnerability based on the at least one violation of the client security policy.

7. A system for web application vulnerability scanning comprising:
   one or more processors communicatively coupled to a network; wherein the one or more processors are configured to:
   crawl a web application for content associated with the web application, including generating dynamic interactions with interface elements to elicit additional dynamic content;
   generate a client security policy based on the content associated with the web application;
   derive test vectors from the client security policy;
   simulate at least one user interaction with the web application using an augmented web browser that is configured to enforce the client security policy during a simulation; and
   scan the web application for vulnerabilities by comparing an observed behavior of the web application in response to the at least one simulated user interaction to an allowed behavior defined by the generated client security policy.

8. The system of claim 7, wherein the one or more processors are further configured to perform dynamic analysis on the content associated with the web application.

9. The system of claim 7, wherein the web application comprises at least one webpage.

10. The system of claim 7, wherein the client security policy comprises a white list of at least one allowable source for content of the web application.

11. The system of claim 10, wherein the at least one allowable source for content of the web application comprises at least a location of a JavaScript script.

12. An article of manufacture for web application vulnerability scanning, the article of manufacture comprising:
   at least one non-transitory processor readable storage medium; and
   instructions stored on the at least one medium;
   wherein the instructions are configured to be readable from the at least one medium by at least one processor and thereby cause the at least one processor to operate so as to:
   crawl a web application for content associated with the web application, including generating dynamic interactions with interface elements to elicit additional dynamic content;
   generate a client security policy based on the content associated with the web application;
   derive test vectors from the client security policy;
   simulate at least one user interaction with the web application using an augmented web browser that is configured to enforce the client security policy during a simulation; and
   scan the web application for vulnerabilities by comparing an observed behavior of the web application in response to the at least one simulated user interaction to an allowed behavior defined by the generated client security policy.

13. The article of manufacture of claim 12, wherein the instructions cause the at least one processor to operate further so as to perform dynamic analysis on the content associated with the web application.

14. The article of manufacture of claim 12, wherein the web application comprises at least one webpage.

15. The article of manufacture of claim 12, wherein the client security policy comprises a white list of at least one allowable source for content of the web application.

16. The article of manufacture of claim 15, wherein the at least one allowable source for content of the web application comprises at least a location of a JavaScript script.

* * * * *